US008818899B2

(12) United States Patent
Payne et al.

(10) Patent No.: US 8,818,899 B2
(45) Date of Patent: Aug. 26, 2014

(54) METHOD AND APPARATUS FOR DEPLOYING AND LICENSING WIRELESS COMMUNICATION DEVICE COMPUTER SOFTWARE INFRASTRUCTURE TO MANUFACTURERS

(75) Inventors: Susan Payne, Toronto (CA); Shawn Kahandaliyanage, Kitchener (CA); Kerry W. Johnson, Kanata (CA)

(73) Assignee: BlackBerry Limited, Waterloo (CA)

( * ) Notice: Subject to any disclaimer, the term of this patent is extended or adjusted under 35 U.S.C. 154(b) by 1918 days.

(21) Appl. No.: 11/037,447

(22) Filed: Jan. 19, 2005

(65) Prior Publication Data
US 2006/0190407 A1 Aug. 24, 2006

(51) Int. Cl.
*G06F 21/00* (2013.01)
(52) U.S. Cl.
USPC .................................. 705/59; 726/26; 705/1.1
(58) Field of Classification Search
CPC ..................................................... G06F 21/10
USPC .................................................... 705/50–79
See application file for complete search history.

(56) References Cited

U.S. PATENT DOCUMENTS

| | | | | |
|---|---|---|---|---|
| 5,375,206 A | * | 12/1994 | Hunter et al. | 717/176 |
| 5,758,069 A | * | 5/1998 | Olsen | 705/59 |
| 5,825,883 A | * | 10/1998 | Archibald et al. | 705/53 |
| 6,105,069 A | * | 8/2000 | Franklin et al. | 709/229 |
| 6,188,995 B1 | * | 2/2001 | Garst et al. | 705/59 |
| 6,754,833 B1 | | 6/2004 | Black et al. | |
| 6,795,700 B2 | | 9/2004 | Karaoguz et al. | |
| 6,910,015 B2 | * | 6/2005 | Kawai | 705/1 |
| 7,143,067 B1 | * | 11/2006 | Cheston et al. | 705/59 |
| 7,917,133 B2 | * | 3/2011 | Payne et al. | 705/64 |
| 2001/0054026 A1 | * | 12/2001 | Choate | 705/52 |
| 2002/0198847 A1 | | 12/2002 | Fahraeus | |
| 2003/0033209 A1 | * | 2/2003 | Minear et al. | 705/26 |
| 2003/0084283 A1 | * | 5/2003 | Pixton | 713/163 |
| 2003/0185240 A1 | | 10/2003 | Vuong | |
| 2004/0054786 A1 | | 3/2004 | Kjellberg et al. | |
| 2004/0110494 A1 | * | 6/2004 | Cohen et al. | 455/414.1 |
| 2004/0127277 A1 | * | 7/2004 | Walker et al. | 463/16 |
| 2004/0203683 A1 | | 10/2004 | Engstrom et al. | |

OTHER PUBLICATIONS

Research In Motion introduces 'BlackBerry Connect' licensing program. (Mar. 17). PR Newswire,1. Retrieved Mar. 18, 2008, from Business Dateline database. (Document ID: 306512971).*
White, "How Computers Work", Millennium Edition, 1999, Que Corporation, Indianapolis, IN, all pages.*

(Continued)

*Primary Examiner* — Jacob C. Coppola
(74) *Attorney, Agent, or Firm* — Perry + Currier Inc.; Kristjan Spence

(57) ABSTRACT

There is disclosed a system method for deploying and licensing wireless communication device computer software infrastructure. In an embodiment, the method comprises: licensing at least one compiled feature-provisioning computer program with a disclosed application program interface (API) to a licensee that is a manufacturer or distributor or seller of wireless communication devices; using the disclosed API to integrate such licensed program into wireless communication devices as offered to end users; configuring the wireless communication devices to provide notification of initial activation of the licensed program by an end user or licensee, thereby triggering collection of licensor revenue based on use of the licensed program by the end user of the device; and sharing collected licensor revenue with a licensee of the program in accordance with a revenue sharing arrangement.

8 Claims, 10 Drawing Sheets

(56) References Cited

OTHER PUBLICATIONS

Derfler, "How Networks Work", Bestseller Edition, 1996, Ziff-Davis Press, Emeryville, CA, all pages.*

Gralla, "How the Internet Works", Millennium Edition, 1999, Que Corporation, Indianapolis, IN, all pages.*

Muller, "Desktop Encyclopedia of the Internet", 1999, Artech House Inc., Norwood, MA, all pages.*

Strunk et al., "The Elements of Style," Third Edition, 1979, MacMillan Publ. Co., Inc., New York, NY, all pages.*

* cited by examiner

METHOD AND APPARATUS FOR DEPLOYING AND LICENSING WIRELESS COMMUNICATION DEVICE COMPUTER SOFTWARE INFRASTRUCTURE TO MANUFACTURERS

BACKGROUND

1. Technical Field

This invention generally relates to method and apparatus for deploying and/or licensing wireless communication device computer software infrastructure to manufacturers and/or distributors and/or sellers or the like of wireless communication devices.

2. Related Art

Wireless communication devices are now well known and commonly used. Such devices are manufactured or distributed or sold by numerous entities some of which provision their particular devices with unique features. Various service providers (e.g., wireless carriers or communication data relay service providers or the like) often also provide end user devices having various suites of features. It is even conceivable that a sophisticated end user or a large enterprise utilizing a number of such devices might improvise their own unique suite of device features.

It is also known that sometimes two or more parties (e.g., wireless carrier services and device manufacturers) will produce and bring an end user device product to market with particular suites of available features. Obviously there have been, in effect, joint developments with licenses being granted in one or both directions so as to produce a product whose ultimate revenue stream from end users will benefit all of those involved in the joint development project.

Some examples of prior arrangements for provisioning wireless devices with features that provide revenue sharing between two or more parties involved with the feature development, provisioning and/or service are noted below:

US 2002/0,198,847 A1-Fahraeus
US 2004/203,683 A1-Engstrom et al.
US 2003/0,185,240 A1-Vuang
US 2004/0,054,786-Kjellberg et al.
U.S. Pat. No. 6,754,833 B1-Black et al.
U.S. Pat. No. 6,795,700 B1-Karaoguz et al.

However, it is not believed that the prior art has yet provided a simple, integrated solution that incorporates licensing, revenue sharing and provisioning so as to permit a device manufacturer to easily license one or more features and include them in an end user device.

BRIEF SUMMARY

We have now recognized that it is possible to provide a simple, integrated solution that incorporates licensing, revenue sharing and provisioning (or any sub-combination thereof) so that a device manufacturer may easily become a licensee of software features provided by willing licensors.

The exemplary solution to this problem provides a software licensing program targeted at hardware manufacturers, distributors, sellers, etc. It is distribution model independent. That is, although possible, it is not necessary for the jointly developed end-user feature-provisioning software to be vended directly to an end user. For example, such direct after-market vending to end users may be achieved as described in a related U.S. patent application Ser. No. 11/019, 941 (now issued U.S. Pat. No. 7,917,133) entitled Method and Apparatus for After-Market Vending of Feature-Provisioning Software to Third Party Mobile Wireless Communication Devices, the entire content of which is hereby incorporated by reference.

Using the exemplary embodiment described below, wireless communication device feature-provisioning computer software (i.e., compiled computer program logic code) may be licensed, developed and utilized so as to effectively connect that device to the available infrastructure of a communication data relay service provider or the like. Furthermore, such licensing of feature-provisioning software from a third party (e.g., the communication data relay service provider), also permits joint revenue sharing with the licensee (e.g., the manufacturer of the device and/or a wireless service provider). In this manner, a communication data relay service provider that normally equips its own end user handsets with a suite of functions (e.g., email, wireless calendar, IT management, GAL lookup, MDS, BWC, etc.) can also now conveniently enable mobile device manufacturers to equip its own handsets with similar functionality—using the trusted, already deployed, data relay service provider's software under license with revenue sharing coming back to the licensor in a convenient way as user devices are actually activated in the field.

This process need not be an automated process where a licensee can simply obtain the compiled code. The licensing process may include a license, development and a maintenance and support contact. The licensed compiled code can be sent electronically over a secure connection (ftp/PGP) by the licensor's development team to the licensee development team. Then there can be a joint integration workshop where both teams work together to integrate the compiled code onto a target handset.

The licensor need not guarantee a royalty payment through automated software features in the licensed software itself. A base license fee may typically be agreed upon up front by the licensee and paid to licensor (whether on a per unit shipped with the licensed software or a flat fee). To insure ongoing revenue sharing, the wireless gateway (relay) may log how many licensee devices are active on the licensor's network (assuming that the licensor is the data relay service provider), and from there revenue sharing, if any, can be allocated (e.g., a share of the licensor's fees from a carrier based on licensed software usage may be allocated back to the licensee/manufacturer).

This invention may be embodied, at least in part, in hardware, software or a combination of hardware and software. The invention also provides a method for deploying and licensing wireless communication device computer software infrastructure to manufacturers et al of such devices. The exemplary embodiment is realized, at least in part, by executable computer program code which may be embodied in physical program memory media.

BRIEF DESCRIPTION OF THE DRAWINGS

These and other objects and advantages of this invention will be better understood and appreciated in conjunction with the following detailed description of exemplary embodiments taken together with the accompanying drawings, of which.

DETAILED DESCRIPTION OF EXEMPLARY EMBODIMENTS

Figure 1:
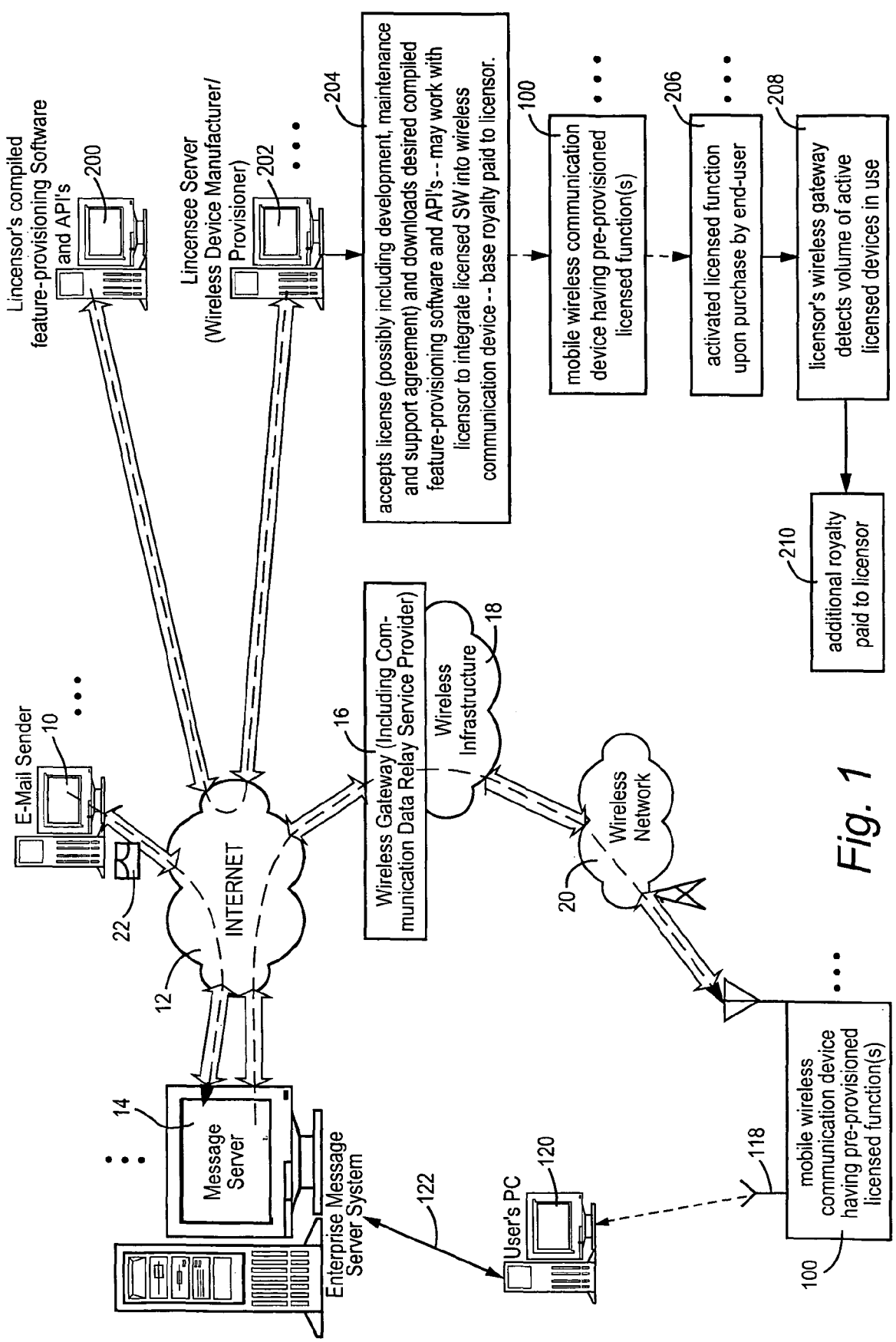
FIG. 1 is an overall system wide schematic view of an exemplary wireless email communication system incorporating a mobile wireless communication device that may be pre-provisioned with one or more features or suites of features that can be activated upon purchase causing a monetary royalty to effectively be paid to the original licensor of the feature-provisioning software (and no doubt to the device manufacturer as well)

FIG. 1 is an overview of an exemplary communication system in which a wireless communication device 100 having pre-provisioned licensed function(s) may be used. One skilled in the art will appreciate that there may be hundreds of different system topologies. There may also be many message senders and recipients. The simple exemplary system shown in FIG. 1 is for illustrative purposes only, and shows perhaps the currently most prevalent Internet email environment.

FIG. 1 shows an email sender 10, the Internet 12, an enterprise (e.g., corporate client-owned) message server system 14, a wireless gateway 16 (e.g., provided by a communication data relay service provider), wireless infrastructure 18, wireless network(s) 20 and mobile communication device 100.

An email sender 10 may, for example, be connected to an ISP (Internet Service Provider) on which a user of the system has an account, located within a company, possibly connected to a local area network (LAN), and connected to the Internet 12, or connected to the Internet 12 through a large ASP (application service provider) such as America Online™ (AOL). Those skilled in the art will appreciate that the systems shown in FIG. 1 may instead be connected to a wide area network (WAN) other than the Internet, although email transfers are commonly accomplished through Internet-connected arrangements as shown in FIG. 1.

The enterprise message server 14 may be implemented, for example, on a network computer within the firewall of a corporation, a computer within an ISP or ASP system or the like, and acts as the main interface for email exchange over the Internet 12. Although other messaging systems might not require a message server system 14, a mobile device 100 configured for receiving and possibly sending email will normally be associated with an account on a message server. Perhaps the two most common message servers are Microsoft Exchange™ and Lotus Domino™. These products are often used in conjunction with Internet mail routers that route and deliver mail. These intermediate components are not shown in FIG. 1, as they do not directly play a role in the invention described below. Message servers such as server 14 typically extend beyond just email sending and receiving; they also include dynamic database storage engines that have predefined database formats for data like calendars, to-do lists, task lists, email and documentation.

The wireless gateway 16 (typically including a communication data relay service provider) and infrastructure 18 provide a link between the Internet 12 and one or more wireless network 20. The wireless infrastructure 18 determines the most likely network for locating a given user and tracks the users as they roam between countries or networks. A message is then delivered to the mobile device 100 via wireless transmission, typically at a radio frequency (RF), from a base station in the wireless network 20 to the mobile device 100. The particular network 20 may be virtually any wireless network over which messages may be exchanged with a mobile communication device.

As shown in FIG. 1, a composed email message 22 is sent by an email sender 10, located somewhere on the Internet 12. This message 22 typically uses traditional Simple Mail Transfer Protocol (SMTP), RFC 822 headers and Multipurpose Internet Mail Extension (MIME) body parts to define the format of the mail message. These techniques are all well known to those skilled in the art. The message 22 arrives at the message server 14 and is normally stored in a message store. Most known messaging systems support a so-called "pull" message access scheme, wherein the mobile device 100 must request that stored messages be forwarded by the message server to the mobile device 100. Some systems provide for automatic routing of such messages which are addressed using a specific email address associated with the mobile device 100. In a preferred embodiment, messages addressed to a message server account associated with a host system such as a home computer or office computer 120 which belongs to the user of a mobile device 100 are redirected (i.e., "pushed") from the message server 14 to the mobile device 100 as they are received.

Regardless of the specific mechanism controlling forwarding of messages to mobile device 100, the message 22, or possibly a translated or reformatted version thereof, is sent to wireless gateway 16. The wireless infrastructure 18 includes a series of connections to wireless network(s) 20. These connections could be Integrated Services digital Network (ISDN), Frame Relay or T1 connections using the TCP/IP protocol used throughout the Internet. As used herein, the term "wireless network" is intended to include any or all of three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple-Access (CDMA) networks, (2) the Group Special Mobile or the Global System for Mobile Communications (GSM) and the General Packet Radio Service (GPRS) networks, and (3) future third-generation (3G) networks like Enhanced Data-rates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

Figure 2:
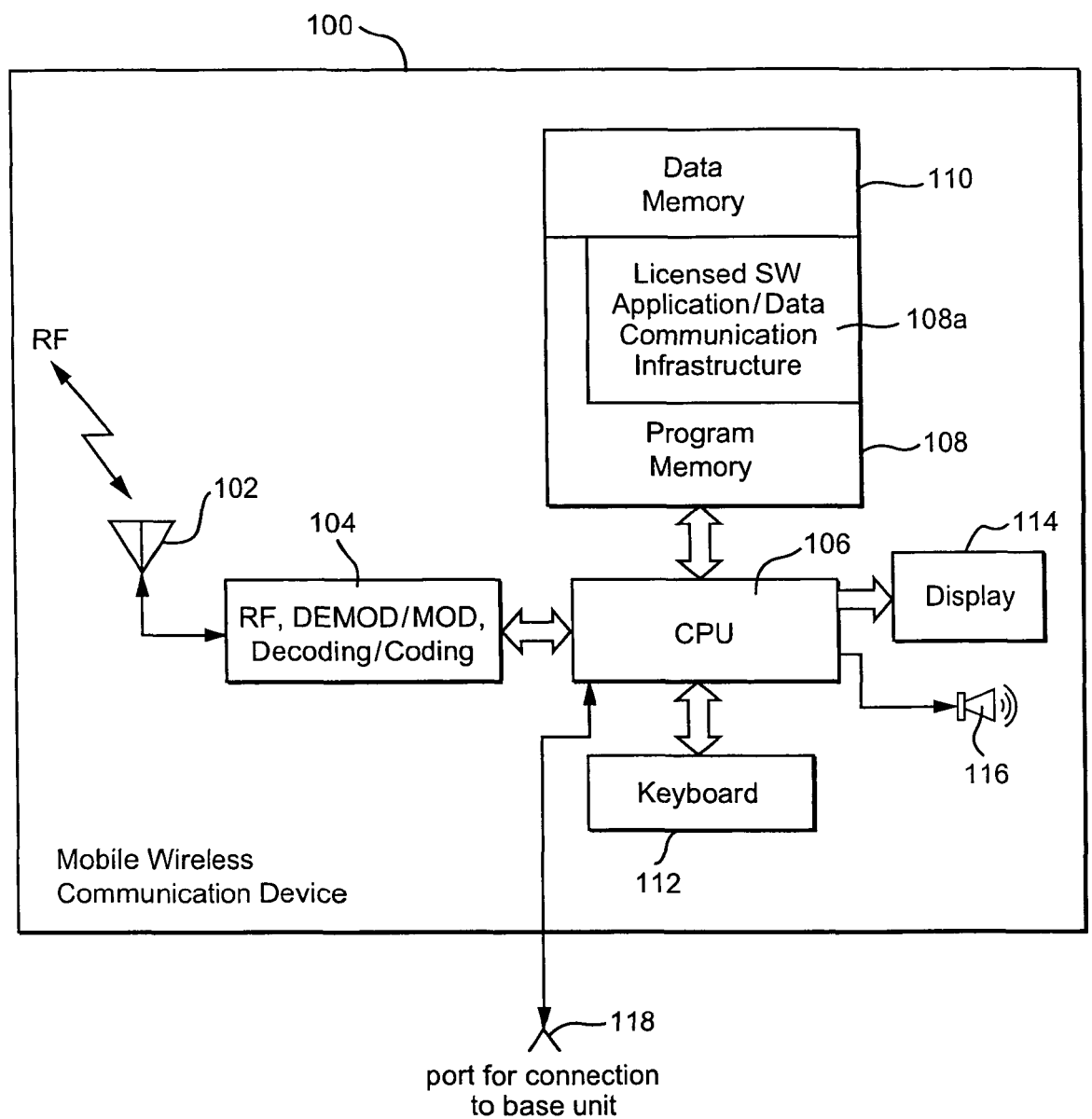
FIG. 2 is an abbreviated schematic diagram of hardware included within an exemplary mobile wireless communication device as shown in FIG. 1.

As depicted in FIG. 2, mobile communication device 100 includes a suitable RF antenna 102 for wireless communication to/from wireless network 20. Conventional RF, demodulation/modulation and decoding/coding circuits 104 are provided. As those in the art will appreciate, such circuits can involve possibly many digital signal processors (DSPs), microprocessors, filters, analog and digital circuits and the like. However, since such circuitry is well known in the art, it is not further described.

The mobile communication device 100 will also typically include a main control CPU 106 which operates under control of a stored program in program memory 108 (and which has access to data memory 110). CPU 106 also communicates with a conventional keyboard 112, display 114 (e.g., an LCD) and audio transducer or speaker 116. Suitable computer program executable code is stored in portions of program memory 108 including licensed application and/or data communication infrastructure software (i.e., executable program logic) at 108a to constitute the modus operandi of wireless device 100.

Figure 3:
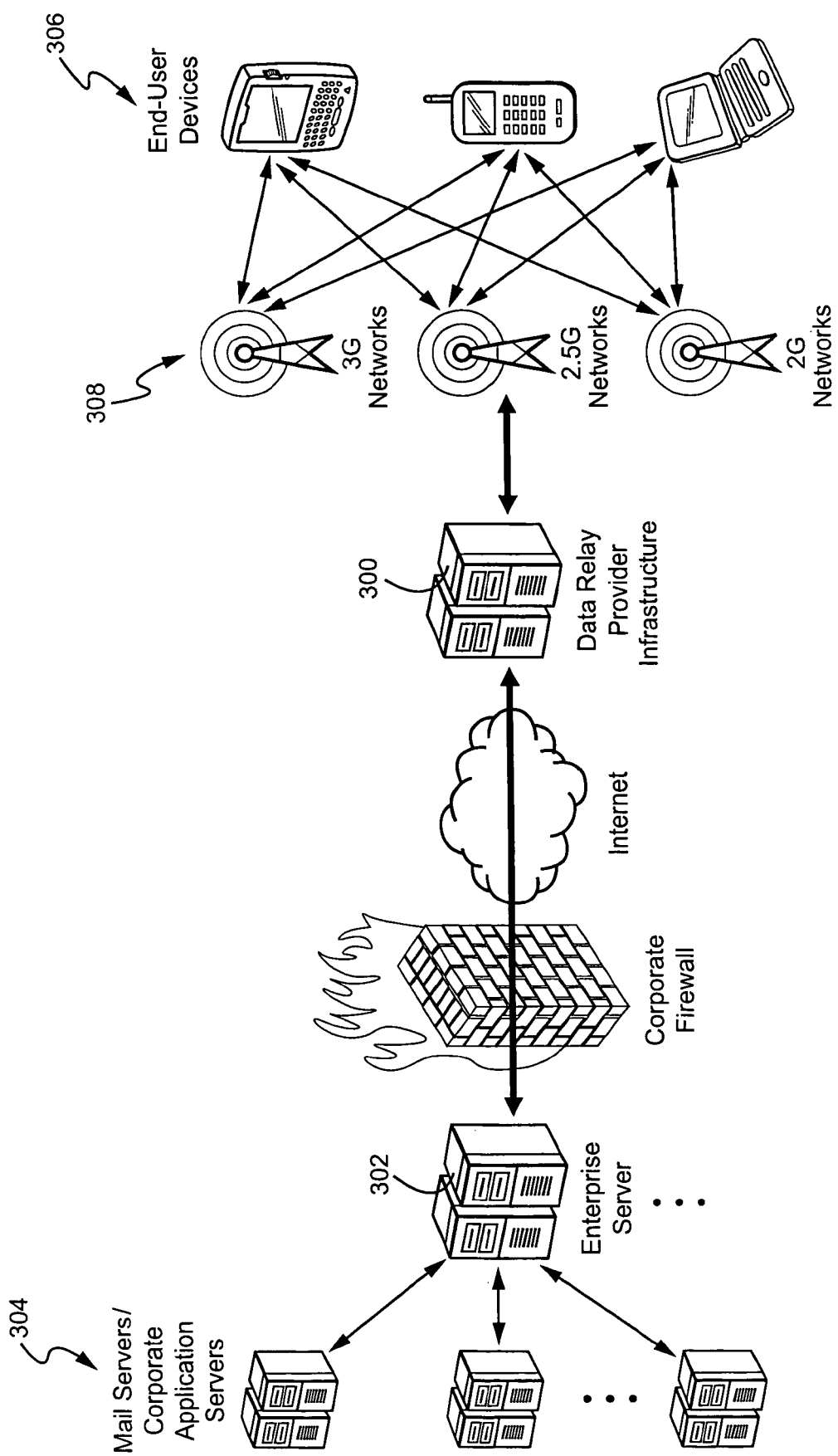
FIG. 3 is an exemplary abbreviated schematic diagram of typical platform hardware that may be employed in the system of FIG. 1.

As depicted in FIG. 3, the system of FIG. 1 may involve end user device features that are effectively provided by a data relay provider infrastructure 300. Cooperating software in the enterprise servers 302 and/or mail servers/corporate application servers 304 and/or in the end user devices 306 cooperate via various communications media (e.g., the Internet, corporate firewall, various wireless networks 308, etc.) to provide certain graphical user interfaces for various kinds of functionalities (e.g., email, calendar, management, etc.).

As depicted in FIG. 1 and as will be appreciated by those in the art, many mobile wireless communication devices 100 include a port 118 for connection to the user's PC 120. Typically, the user's PC 120 is also connected via network 122 with the message server system 14 of an enterprise (e.g., the user's employer). Of course, there will be many enterprise message servers 14 each having associated with it many mobile wireless communication devices 100, each of which typically may also have a user's PC base unit 120 associated with it in a real world system.

In a system like that of FIG. 1, a licensor's website 200 may includes compiled feature-provisioning software and corresponding application program interfaces (APIs). This licensor's website 200 is accessible via the Internet 12 (e.g., a service ptp/pgp connection) to a licensee's server 202. This provides a convenient secure mechanism for a licensee (wireless device manufacturer or distributor or seller or the like provisioning user devices 100 with features) to receive the compiled licensed software and the associated API. Such a licensee may conventionally interact with the licensor's website 200 to download desired compiled feature-provisioning software with its corresponding API as depicted at 204 in FIG. 1. As will be appreciated, the downloading step typically will be preceded by a suitable negotiated license agreement (which may include development, maintenance and support contract provisions) while such negotiation can be conducted electronically by semi- or fully automated processes, it need not be. Typically there will also be a joint integration workshop between both licensor and licensee teams to integrate the licensed compiled code into a target handset.

Figure 4:
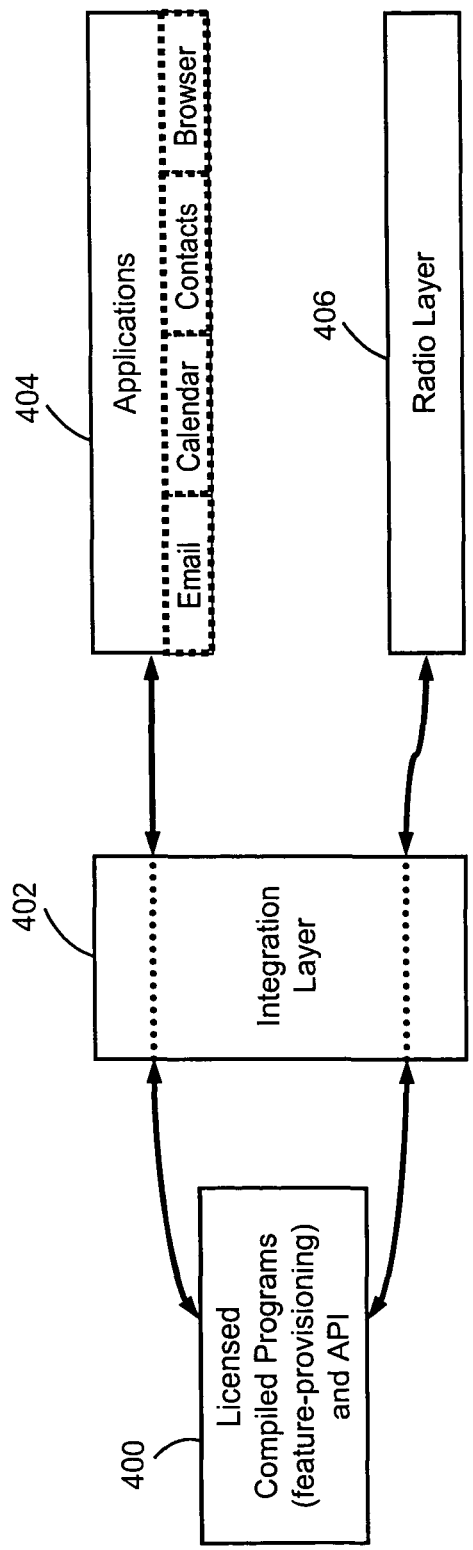
FIG. 4 is an abbreviated schematic diagram of various computer program software layers in a pre-provisioned end user device.

As depicted in FIG. 4, the licensed compiled feature-provisioning programs 400 may be utilized via its also disclosed API so that the manufacturer (or other licensee) can now design an integration layer 402 of software interfacing the licensed feature-provisioning already compiled software with other manufacturer-designed application software 404 and/or radio layer software 406.

Of course, as will be appreciated, if the manufacturer desires and if the licensed compiled feature-provisioning program permits it, then the application software 404 and/or radio layer software 406 may actually be directly provided by the licensed compiled feature-provisioning software (e.g., possibly without an integration layer 402). In this latter situation, the pre-provisioned wireless communication device would, in effect, duplicate the suite of applications and features associated with the licensed compiled feature-provisioning programs 400 directly. That is, the device might appear to be the same in look and feel as a device that is otherwise manufactured and provided by the licensor itself.

In any event, using licensed and downloaded compiled feature-provisioning software, the manufacturer can utilize that software wholly or partially as desired to provide a pre-provisioned wireless communication device with licensed functionality as depicted at 100 in FIG. 1. After purchase by an end user, that device may be activated as depicted at 206 by the end user (or the seller, etc.). When the licensed functionality of the device 100 is utilized, the volume of such utilization may be detected (e.g., by the licensor wireless gateway data relay service provider) at 208 to document the need for additional royalty payments to the licensor as depicted at 210.

Alternatively, if desired, the licensed software (or other software integrated therewith) may itself include program logic requirements that insures a further royalty will be paid to the licensor (e.g., by the end user directly such as by credit or debit card transactions via the Internet or by the licensee effecting payment to the licensor upon receiving suitable notification from the end user activation process, etc.). Of course there may also be no additional royalty due under the negotiated license agreement.

Figure 5:
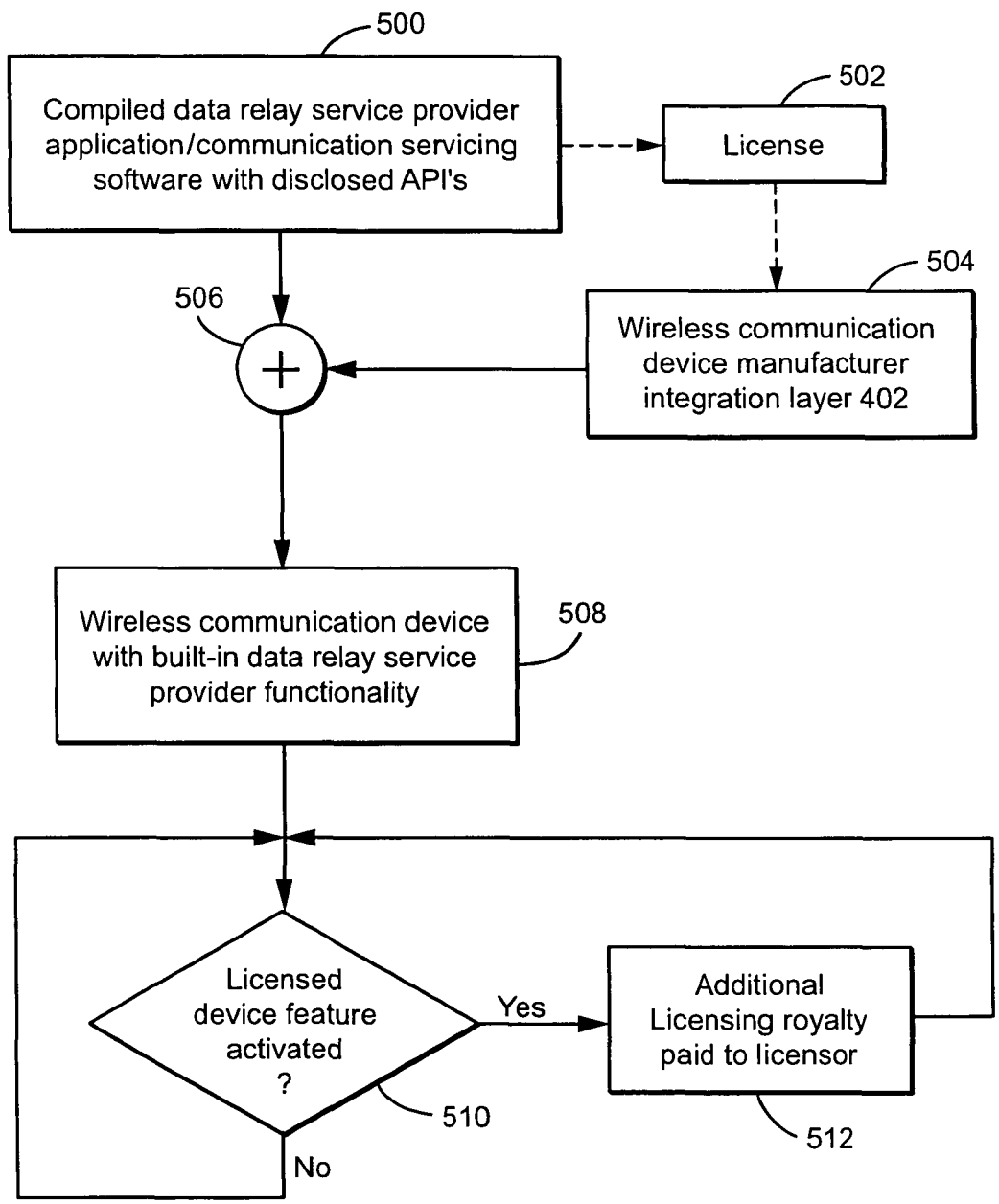
FIG. 5 is an exemplary abbreviated schematic flowchart of computer software (i.e., program logic) that may be employed in an exemplary embodiment to deploy licensed compiled data relay service provider application/communication servicing software with disclosed APIs to a wireless communication device manufacturer and, if desired, to provide a future royalty stream as end user devices are activated and/or utilized.

Any exemplary system is further schematically illustrated at FIG. 5. For example, at 500 a licensor's (e.g., a data relay service provider) compiled application/communications servicing software is created, each with an accompanying respectively associated application program interface (API). Once an appropriate license 502 is in place with a wireless communication device manufacturer or the like, then, using the disclosed API, the manufacturer can create an integration layer 402 as depicted at 504 in FIG. 5. These two different software layers and perhaps other software as well can then be integrated and linked or loaded as depicted at 506 to provide a pre-provisioned wireless communication device as depicted at 508. For example, the device may have built in data relay service provider functionality associated with the compiled application/communication servicing software licensed at 502 from a licensor to a licensee. When the licensed functionality of this pre-provisioned device is first activated and/or whenever it is detected as active (e.g., by the data relay service provider) at 510 (e.g., possibly with required concurrent interface to the Internet or other communication media), then suitable data can be sent to the licensor and/or licensee so as to document the need for a further licensing royalty if make part of the license agreement 502) paid to the licensor as depicted at 512 in FIG. 5. As previously noted, this monetary payment may be required of the end user if a certain feature or suite of features is activated or, as the license may provide, may require further monetary payment to be made from the licensee (e.g., the device manufacturer) to the licensor. Fro example, the additional royalty could be triggered by the average usage of a licensed feature on a monthly basis.

Figure 6:
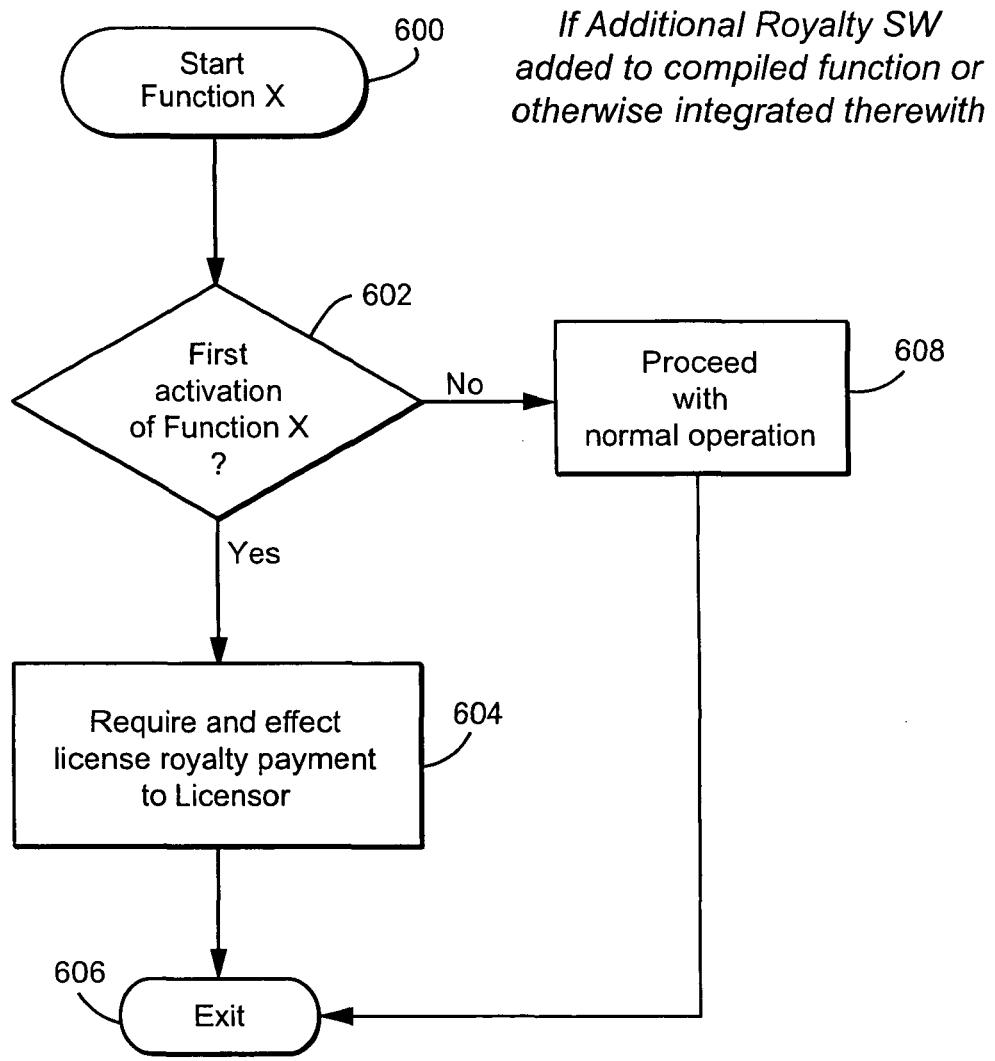
FIG. 6 is an exemplary abbreviated schematic flowchart of optional computer software (i.e., program logic) that, if desired, may be utilized in the system of FIG. 1 as a part of an activation software in the licensed compiled function-provisioning software.

As depicted in FIG. 6, the pre-provisioned user device may optionally include suitable program logic that is entered at 600 whenever a new function X is to be started. If this is detected at 602 to be the first activation of that particular function X, then, as previously described, suitable automatic steps may be taken at 604 to require and effect a license royalty payment to the licensor at 604 before exit is taken at 606. If this is not detected to be a first activation of function X at 602, then exit may be taken directly at 606 or, if some additional housekeeping is necessary for that particular implementation, then such may be accomplished at 608 before exit is taken at 606.

Figure 7:
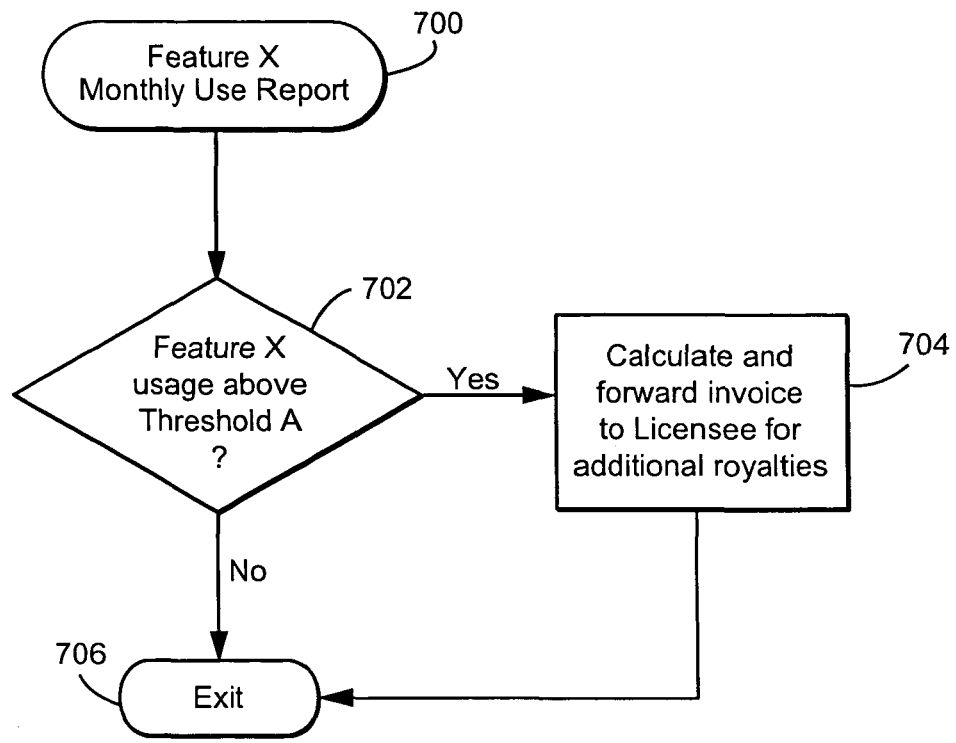
FIG. 7 is an exemplary abbreviated schematic flowchart of computer software (i.e., program logic) that may be utilized by a data relay service provider to invoice a licensee for additional royalty payments based upon detected usage of a licensed feature.

As previously noted, the data relay provider 16 may maintain licensed feature usage data. Thus, as depicted in FIG. 7, for a given feature X, a monthly usage report routine may be entered at 700. If the feature usage is above a predetermined threshold A (which could be zero or otherwise depending upon the license agreement) as detected at 702, then at 704 an appropriate invoice is calculated and sent to the licensee for an additional royalty payment. In either case, the routine is exited at 706.

In the above description, there are references to handsets connecting to the data relay provider's enterprise server or allowing licensees to leverage the data relay provider's presence in the enterprise space. The "connect" and "built-in" handsets can also connect to the data relay provider's internet service (e.g., a data relay provider's web client) so that the programs capitalize on the overall data relay provider's value proposition (e.g., both enterprise and prosumer).

As may be appreciated from the above, the "built-in" handset may substantially change the user interface, or in some cases, it may be the entire user interface. While the "connect" handset user interface changes, if any, may be quite subtle (e.g., since it uses existing operating system and applications on the handset), the "built-in" handset user interface is typically not at all subtle. For example, "built-in" embodiments may be implemented in at least two types.

First, the "built-in" features may run in parallel with an existing operating system and application set. In this case, when the user is using the data relay provider functionality, he/she accesses the data relay provider applications but can also access native applications on the handset to do other functions. For example, when the "built-in" data relay provider functionality is enabled, a user may access the data relay provider email application to do email functions. However, the user may also use a native phone application to make telephone calls. Thus the integration of data relay provider "built-in" functions may significantly change the overall user experience/interface of the handset.

Second, the "built-in" functionality may be the only operating environment on the handset. In this type of integration, there are no other native applications. The data relay provider "built-in" functionality is the entire user experience. In this case, the user interface is nearly identical to that encountered by a handset provided directly by the data relay provider itself.

With respect to revenue sharing, the overall approach as to how data provider services are integrated into manufactured handsets need not matter. Accordingly, it should be understood that the above exemplary descriptions are not limiting but, instead, merely examples of some possibilities. the "connect" and "built-in" approaches are just two different ways of enabling a licensee's handset to enjoy one or more data relay provider functions. The revenue sharing methodology may be applied the same way to both types of licensee devices.

Some features of the above-described exemplary embodiment(s) are noted below:

Allows vendor to license and integrate third party (e.g., data relay service provider) services into its handsets.

Licensable compiled software (e.g., in the C language) can component enable a wireless device to access data relay provider service.

Can implement data relay provider transport stack.

Can enable secure, push-based access to corporate data.

Stack can link the handset to a data relay enterprise server via data relay provider infrastructure.

The host platform can retain its same look and feel.

Licensed stack can be a "behind-the-scenes" secure connection to an enterprise server.

Can allow a handset to communicate with an enterprise server.

Can be designed to deliver a variety of data relay provider services.

Email may be a first supported service, with others to follow.

Features that can be easily included (e.g., because already part of the data relay provider infrastructure):
    Security: Triple-DES encryption
    Push technology
    Efficient transport: Compression, Partial delivery
    Reliability: Retries, acknowledgements
    IT Policy
    Choice of device and functionality
    Centralized IT management and control
    Can be integrated with existing host applications.

Typical Integration Requirements for Licensed Data Relay Infrastructure
    Typical System requirements:
    32K RAM
    128K non-volatile storage
    Typical OS requirements:
    Memory management
    file system or database
    System timer
    Cryptographic-grade random number generation
    Typical Radio layer requirements:
    IP Services
    Coverage status information
    Roaming notification
    Typical Integration Model
    Data relay provider can license the stack as a compiled software component
    Data relay provider functionality can be exposed through a set of APIs
    Licensee may implement an integration layer to act as the interface between the host environment and the data relay provider stack
        Integration layer can call functions implemented in the stack
            Example: Connect to service, Send message
        Stack can call functions implemented by the integration layer
            Ex: Query connectivity status, "message received" alert
    Integration Overview
To integrate data relay provider services into a wireless device, the following development typically takes place:
    Email client modifications:
        Push
        Partial delivery
        Reply and forward by reference Desktop software modifications:
  Data relay provider specific components can be integrated into existing desktop software
    Can implement communication with an enterprise server to exchange routing info, set filter configuration, exchange crypto keys, etc.
Integration layer development
  If the OS and radio layer do not provide adequate functionality, modifications may be necessary
  All data relay provider wireless services can be supported
  Email, Wireless Calendar, IT Management, GAL Look-up, MDS, BWC
  Plus future wireless services
  Unicode support
  Future networks: CDMA/1×RTT
  Value Proposition: Licensee
  Leverage data relay provider's established brand in the enterprise
  Leverage the data relay provider's enterprise installations worldwide
  Leverage data relay provider's worldwide carrier and channel relationship
    Recurring revenue stream
    Value Proposition: Wireless Carrier
    Diversified data relay provider handset offering to address different market segments
    Leverage existing investment in data relay provider
    Additional service and handset revenue resulting from a broader target market The herein described licensing programs may support any wireless network standard (e.g., future networks) that the data relay provider overall supports. For example, GPRS and CDMA may be currently supported, but that may evolve in the future.

Figure 8:
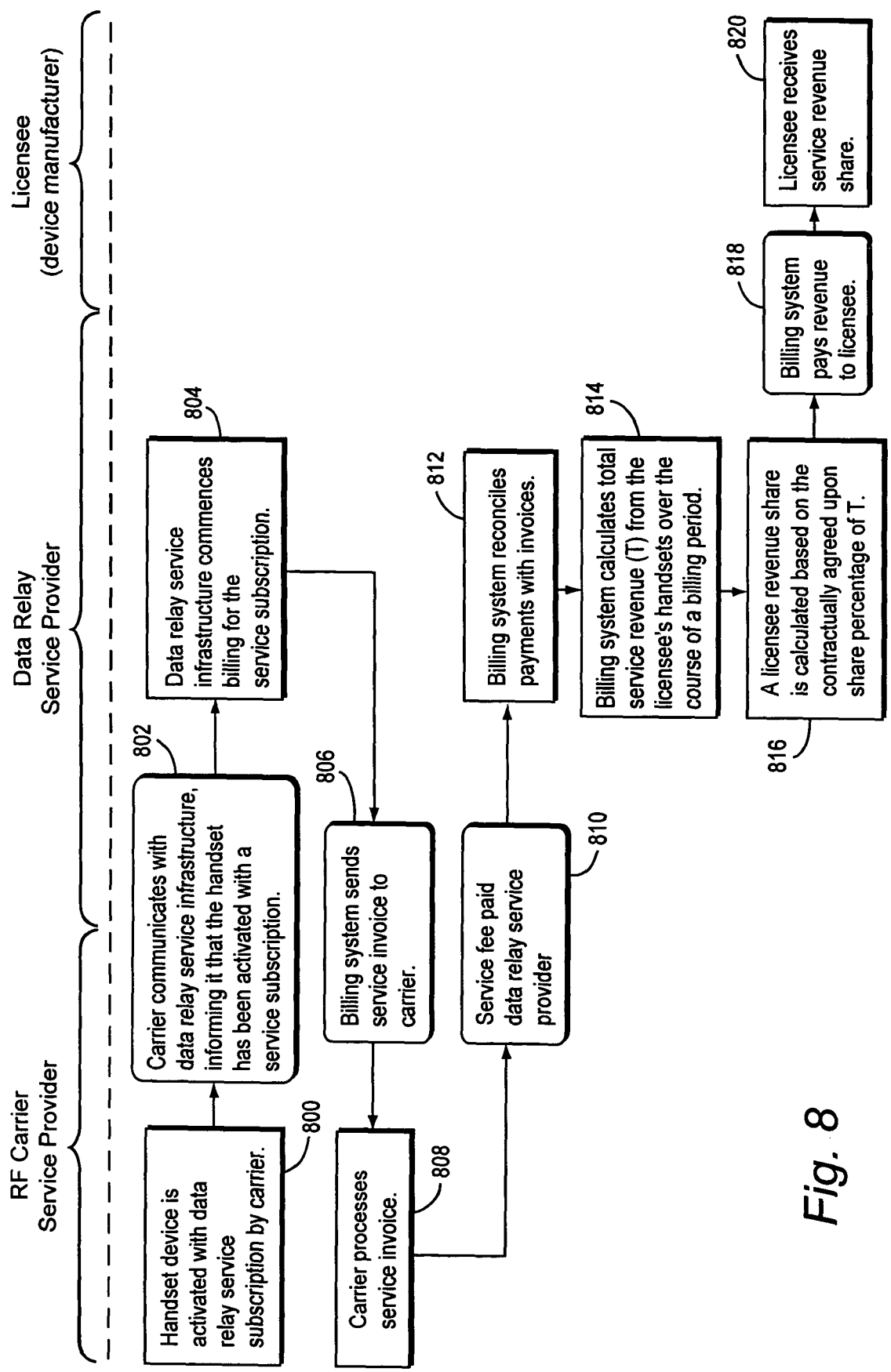
FIG. 8 is an exemplary abbreviated schematic flow chart illustrating a presently preferred method for a licensee to share in a licensor's service fees derived from a carrier service fee paid as a result of user activation of a licensed software feature.

In FIG. 8 exemplary events are depicted from left to right that might typically take place respectively at and between an RF carrier service provider, a data relay service provider and a licensee (e.g., wireless communication device manufacturer). Typically, a handset newly provisioned with a licensed software feature will, if it is to be used, activate such feature with a chosen RF carrier as depicted at 800. The RF carrier has an ongoing service subscription relationship with the data relay service provider and therefore communicates this new activation to the data relay service provider at 802. This permits the data relay service provider infrastructure to then commence billing for the newly activated feature at 804. Regular invoicing of the RF carrier service provider occurs at 806 and normal invoice processing occurs at 808 with the fee being paid to the data relay service provider at 810. The data relay service provider billing system then reconciles payments with invoices in the typical fashion at 812 permitting calculation of the total service revenue T that has been received due to use of licensee's handsets over the course of a billing period at 814. It will be understood that there may be several RF carrier service providers providing such service fee payments for use of a given licensed device feature. At 816 the appropriate licensee's share of such revenue is calculated (based on contractual agreement) at 816 followed by payment being issued at 818 and received by the licensee (device manufacturer) at 820. It will be understood, of course, that other methodologies for sharing revenue with the licensed device manufacturer based on detected actual usage of a licensed feature can be envisioned.

Figure 9:
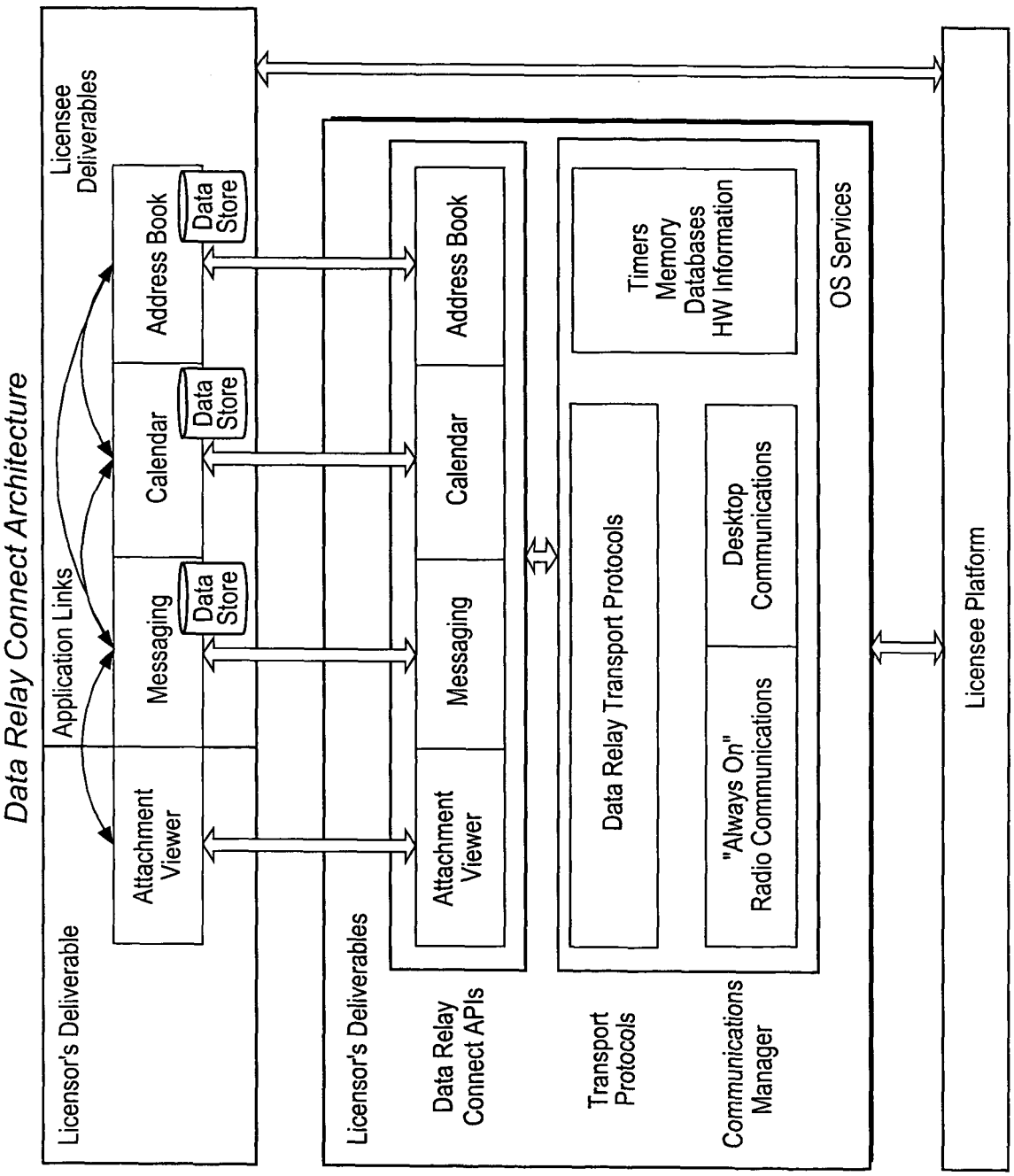
FIGS. 9 and 10 are schematic depictions of device software architecture for "connect" and "built-in" configurations of licensed software.

One exemplary "connect" architecture for utilizing licensed data relay provider software infrastructure is depicted at FIG. 9. Some features of this architecture are noted below:

Data Relay Connect Architecture Package
Transport stack
Provides protocol level access to data relay provider's infrastructure for a customizable experience
Data relay connect transport stack provides protocol low level access to the data relay provider's service
  Reliability: Datagram segmentation, re-assembly, retries and acknowledgements
  Efficiency: Partial "Just in time" delivery and compression
  Security: 3DES Encryption
  Push Delivery: Always On, Always Connected, True Push Experience
  Connection with data relay enterprise server and data relay infrastructure
Data relay provider's connect 2.0 features includes:
Data relay enterprise and Prosumer solutions
Support for Email, email reconciliation, attachment viewing, Calendar, IT Policy, and Address Look-up
Data Relay Provider Connect-Roles
Data Relay Provider
  Provide software APIs for each platform that enables access to data relay provider's network services
  Publish implementation guidelines to achieve fullest data relay provider infrastructure experience
  Support application developers/licensees during development, integration and carrier launch
  Perform device authorization testing to permit access to data relay provider's network infrastructure
  Enable licensees with data relay provider's connect branding program
Application Enablement for Data Relay Provider Services
Device #1 platform: Done by Device #1 mfgr
Device #2: Done by data relay provider
Device #3: Done by UI vendor/licensee
Data relay provider's Connect licensee
Hardware platform
Operating System
Radio Layer
Integration of Data Relay
Integration of applications (messaging, calendaring, etc.)
Device Deployment/Availability
  Licensees can start development upon receipt of APIs
  consult with licensees to determine device availability dates
  Licensees choose which features to expose
  Just because feature is available in API doesn't guarantee that licensee will implement it in its software
  consult with licensees to determine feature availability for its devices
Example of Possible User Experience with Device
  The user can experience the conventional Device GUI first data relay provider augmentation of some or all of the features available via the normal Device GUI.
    Users can still use Outlook inbox, Calendar, and Contact applications as normal.
    Licensed stack receives messages from the data relay provider enterprise server and injects them into the inbox.
    License stack monitors the Outbox for sent messages and passes them to the data relay provider's enterprise server
    Users never interact directly with the licensed stack.
Exemplary IT Policies for "Connect" Architecture
IT Administration Tasks (Licensee Dependent)
Set peer-to-peer key
Set owner info
Reset password and lock device
Kill device
IT Policy Support (Licensee Dependent)

Figure 10:
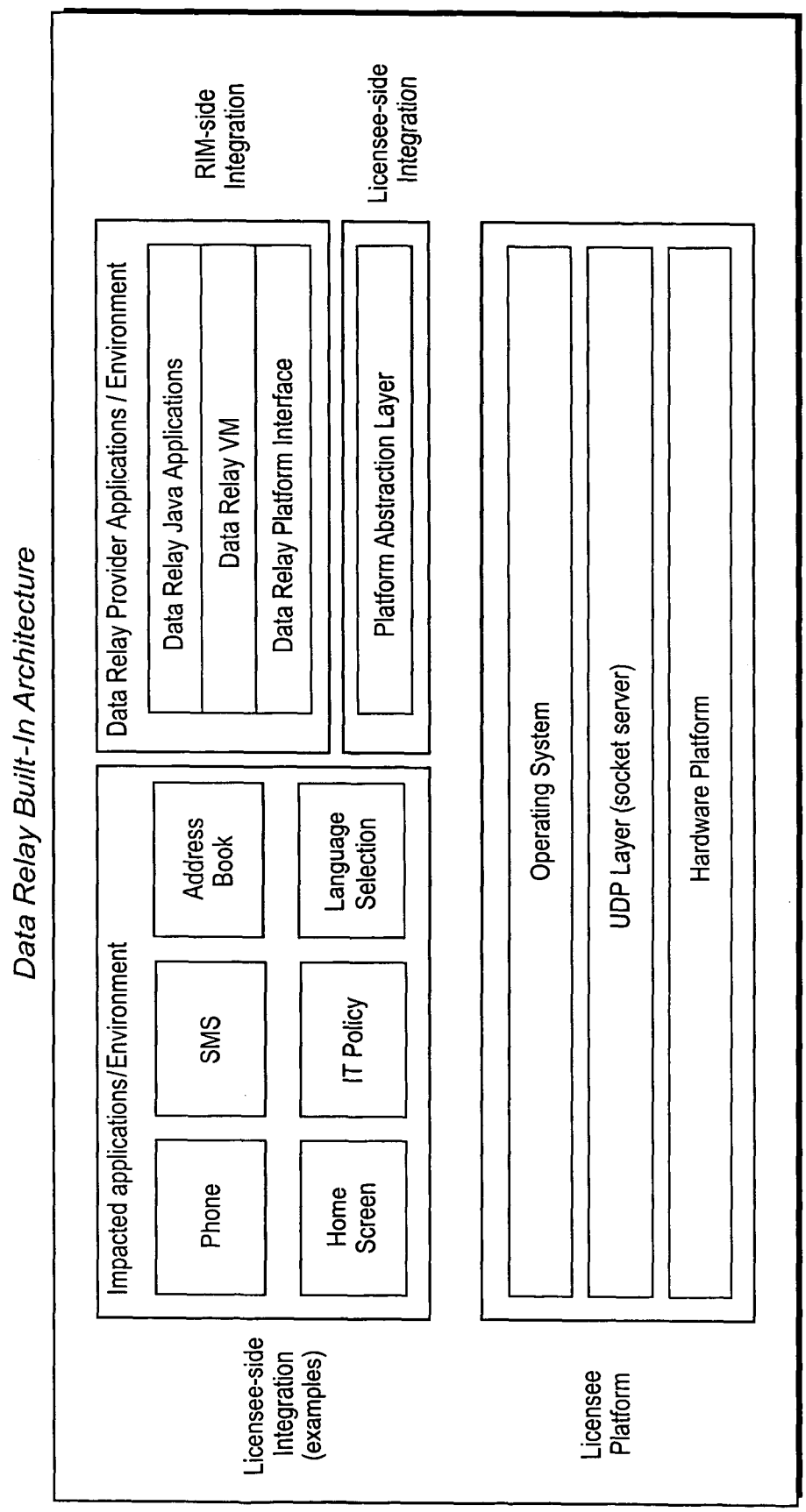

Enable/disable phone
Enable/disable browser
Enable/disable PIN messaging
Enable/disable SMS
Enable/disable BCC
Enable/disable wireless email reconciliation
Allow/disallow user disable password
Allow/disallow 3$^{rd}$ party apps
Password required
Set min password length
Inactivity timeout changeable
Set max inactivity timeout
Password pattern checking?
Set max password age
Set max password attempts
Suppress password echo
Password history
Disallow other email services An exemplary "built-in" architecture for utilizing licensed data relay provider software infrastructure is depicted at FIG. 10. Some features of this architecture are noted below:

Data Relay Built-In Architecture Package
Full-featured application suite
Java Virtual machine delivers native data relay provider applications for complete data relay provider experience
Data relay provider Built-In package provides the data relay provider applications and secure environment to licensees via existing data relay provider java virtual machine Typical data relay provider's Built-In applications/services available:
Email, Contacts, Notes, Calendar, Options, Tasks, Browser, IT Policies, and Lock/Password The data relay provider Built-In package can employ the latest data relay provider Java virtual machine employed on its own handhelds, including enhanced features such as full over the air provisioning; graphics viewers, etc. Wireless carriers can leverage existing investments in data relay provider support, provisioning and sales training due to the similarity between data relay provider's own handhelds and those of the data relay provider's licensed client.

Typical Data Relay Built-In Rules
Data Relay Provider
Provide data relay applications and data relay VM
Work with licensee to integrate data relay provider/licensee applications
Work with licensee to integrate data relay VM with licensee OS
Perform device authorization testing to permit access to data relay provider network infrastructure
Enable licensees with data relay provider Built-In branding program
Licensee
Hardware platform
Operating System
Radio Layer
Work with data relay provider to integrate
Licensee/data relay provider applications
Work with data relay provider to integrate data relay provider VM with licensee OS
Example of User Experience with Data Relay Provider Built-In Package:
The user experience may be equivalent to data relay provider's applications found on its own handhelds
User interface can be themed to adapt to native look and feel of device.
Users may use standard data relay provider's email, calendar and browser.
Identical user interface flow to data relay provider's handhelds providing easy learning curve for existing data relay provider users.

Examples of Built-In Additional Features
Wireless data relay provider synchronization
Wireless email settings
Automatic wireless backup
Wireless encryption key regeneration
AES transport encryption
Sent item synchronization
Use data relay provider router and handheld manager
Cradle-less provisioning
Handheld agent reporting
3$^{rd}$-party application control
Attachment viewing enhancements As those in the art will appreciate, many variations and modifications may be made in the exemplary embodiments described above while yet retaining many of the novel features and advantages of this invention. Accordingly, all such variations and modifications are intended to be included within the scope of the appended claims.

What is claimed is:

1. A method executable in a communication system including a wireless communication device for deploying and licensing wireless communication device computer software infrastructure, said method comprising:

licensing, from a licensor's website, at least one compiled feature-provisioning computer program and an application program interface (API) associated with the computer program to a licensee that is a manufacturer, distributor, or seller of the wireless communication device, the feature-provisioning computer program utilizing a communication data relay service provider and the associated API enabling access to the data relay service provider;

receiving the licensed feature-provisioning computer program and the associated API at a licensee server and using the associated API at the licensee server to integrate the licensed feature-provisioning software program into the wireless communication device having pre-provisioned licensed functions, the wireless communication device providing notification of initial activation of the licensed program on the wireless communication device to trigger licensor revenue based on use of the licensed program at the wireless communication device, the licensor revenue determined based on usage of a feature corresponding to the licensed program as shown by utilization detected by the data relay service provider; and sharing collected licensor revenue with a licensee of said program in accordance with a revenue sharing arrangement.

2. The method as in claim 1 wherein said at least one licensed feature-provisioning computer program permits connection to said data relay service provider without substantially altering the graphical user interface (GUI) otherwise used by said manufacturer, distributor, or seller.

3. The method as in claim 2 wherein said licensed feature provisioning computer program is interfaced with at least one other application or utility software used by the manufacturer, distributor, or seller, the at least one other application or utility software having an integration layer of software that utilizes said API to access and utilize the licensed feature-provisioning computer program.

4. The method as in claim 1 wherein said at least one licensed and compiled feature-provisioning computer program permits connection to a data relay service provider using substantially the same built-in graphical user interface (GUI) utilized by the data relay service provider in its own marketed wireless communication devices.

5. A computer readable medium on which is stored at least one computer program which, when executed, facilitates a method for deploying and licensing wireless communication device computer software infrastructure within a communication system including a wireless communication devices, said computer program comprising executable computer program code for:

licensing, from a licensor's website, at least one compiled feature-provisioning computer program and an application program interface (API) associated with the computer program to a licensee that is a manufacturer, distributor, or seller of the wireless communication device, the feature-provisioning computer program utilizing a communication data relay service provider and the associated API enabling access to the data relay service provider;

receiving the licensed feature-provisioning computer program and the associated API at a licensee server and using the associated API at the licensee server to integrate the licensed feature-provisioning software program into the wireless communication device having pre-provisioned licensed functions as offered to end users, the wireless communication device providing notification of initial activation of the licensed program on the wireless communication device, thereby triggering licensor revenue based on use of the licensed program at the wireless communication device, the licensor revenue determined based on usage of a feature corresponding to the licensed program as shown by utilization detected by the data relay service provider; and sharing collected licensor revenue with a licensee of said program in accordance with a revenue sharing arrangement.

6. The computer readable medium as in claim 5 wherein said at least one licensed feature-provisioning computer program permits connection to s-said data relay service provider without substantially altering the graphical user interface (GUI) otherwise used by said manufacturer/distributor/seller.

7. The computer readable medium as in claim 6 wherein said licensed feature provisioning computer program is interfaced with application and utility software otherwise used by the manufacturer, distributor, or seller with an integration layer of software that utilizes said API to access and utilize the licensed feature-provisioning computer program.

8. The computer readable medium as in claim 5 wherein said at least one licensed feature-provisioning computer program permits connection to a data relay service provider using substantially the same built-in graphical user interface (GUI) utilized by the data relay service provider in its own marketed wireless communication devices.

* * * * *